United States Patent [19]

Wessling et al.

[11] 4,383,073

[45] May 10, 1983

[54] CATIONIC RESIN CURABLE WITH ACID CATALYZED CROSS-LINKERS

[75] Inventors: Ritchie A. Wessling, Midland; Larry D. Yats, Clare, both of Mich.; William O. Perry, Lake Jackson, Tex.

[73] Assignee: The Dow Chemical Company, Midland, Mich.

[21] Appl. No.: 294,690

[22] Filed: Aug. 20, 1981

[51] Int. Cl.$^3$ .............................................. C08L 63/00
[52] U.S. Cl. .................................. 525/486; 524/416; 524/424; 525/481; 525/510; 525/511
[58] Field of Search ............... 525/481, 486, 510, 511; 260/29.3, 29.4 R; 524/416, 424

[56] References Cited

U.S. PATENT DOCUMENTS

| | | | |
|---|---|---|---|
| 2,676,166 | 4/1954 | Webers | 260/85.7 |
| 3,844,998 | 10/1974 | Jeffery | 525/510 |
| 3,937,679 | 2/1976 | Bosso et al. | 260/29.3 |
| 4,017,372 | 4/1977 | Wagener et al. | 204/181 |
| 4,076,676 | 2/1978 | Sommerfeld | 260/29.4 |
| 4,101,486 | 7/1978 | Bosso | 260/29.2 TW |
| 4,110,287 | 8/1978 | Bosso et al. | 260/29.2 |
| 4,119,599 | 10/1978 | Woo et al. | 260/29.4 |
| 4,151,305 | 4/1979 | Davis | 525/510 |

*Primary Examiner*—Paul Lieberman
*Attorney, Agent, or Firm*—I. A. Murphy

[57] ABSTRACT

Water-compatible compositions are described which consist essentially of at least one resinous compound whose backbone is linear or substantially linear and consists essentially of at least one oxyaryleneoxyalkylene or oxyaryleneoxy(1,3-(2-hydroxy)alkylene) unit and which bears at least two functional organic moieties through which cross-linking can occur (preferably groups having active hydrogen, more preferably aliphatic hydroxyl groups) and at least one terminal carbamoylpyridinium group covalently bonded through the ring nitrogen atom combined with an acid curable cross-linking agent. The compositions are useful coating compositions which find particular utility in cathodic electrodeposition. The compounds are prepared, for example, by reacting a linear or substantially linear epoxy resin with a carbamoylpyridine in the presence of sufficient amount of a Brönsted acid and water to stabilize the carbamoylpyridinium salt thus formed.

5 Claims, No Drawings

CATIONIC RESIN CURABLE WITH ACID CATALYZED CROSS-LINKERS

BACKGROUND OF THE INVENTION

1. Field of the Invention

This invention pertains to water-compatible resinous compositions consisting essentially of one or more polymers bearing carbamoylpyridinium groups attached to the polymer through the ring nitrogen and which bears at least two active hydrogen attached to the molecule in combination with an acid curable cross-linking resin. This invention further pertains to the use of said compositions in forming aqueous dispersions and to the use of such aqueous dispersions in coating articles.

2. Description of the Prior Art

Aromatic heterocyclic amines have one (or more) nitrogen atoms as a member of a heterocyclic aromatic ring. Such aromatic amines are normally 5- or 6-membered rings. The 6-membered mononuclear heterocyclic ring systems containing one nitrogen atom are by far the more common and are generally referred to as pyridines. Among the pyridine compounds are the substituted pyridines. Such substituted pyridines include the carbamoylpyridines, with which the present invention is concerned. Like other pyridines, the carbamoylpryidines can be alkylated to form pyridinium salts, i.e., carbamoylpyridinium salts. The carbamoyl group

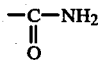

may be attached to the ring carbon atom in the 2, 3 or 4 position.

In electrodeposition, the electroconductive article to be coated is used as either the anode or cathode submerged in an electrocoating bath. The article is coated when a voltage of sufficient magnitude is applied to cause the ionic coating in the bath to migrate to, and deposit upon, the article to be coated. In cathodic electrodeposition, the article to be coated is used as the cathode and the ionic polymer is positively charged. The usual cationic polymers contain basic nitrogen groups in the form of amino groups or quaternary ammonium groups. Typically, the polymers must be cross-linked to develop desirable properties and are normally formulated with cross-linking resins. The acid catalyzed cross-linkers such as the amine aldehyde resins are highly advantageous but do not provide adequate cure for resins containing basic nitrogen. The blocked isocyanate resins were developed to provide acceptable cure for these systems. In electrocoating, it is desirable that the charged resin particles deposit readily and uniformly over the surface of the article, (including the inner or hidden surfaces as well as the exterior surfaces) and coat the article in such a manner as to stop the flow of current. The ability to coat the inner or hidden surfaces is described in the industry as "throwing power." Throwing power is routinely determined in the laboratory and in commercial baths by standard techniques to determine effectiveness of the bath. The higher the throwing power, generally the better. (*Journal of Coatings Technology*, Vol 53, No. 672, January 1981, pages 52–67, Percy E. Pierce, "The Physical Chemistry of the Cathodic Electrodeposition Process," especially pages 63–66.)

SUMMARY OF THE INVENTION

We have now discovered a class of water-compatible compositions which consist essentially of one or more resinous polymers bearing carbamoylpyridinium groups attached to the polymer through the ring nitrogen and at least two active hydrogen groups attached to the resin molecule in combination with an acid curable cross-linking resin. The preferred polymer compositions are those whose backbone is linear or substantially linear and consists essentially of at least one oxyaryleneoxyalkylene or oxyaryleneoxy(1,3-(2-hydroxy)alkylene) unit and which bears at least two active hydrogen groups, (preferably aliphatic hydroxyl groups) and terminal carbamoylpyridinium group covalently bonded through the pyridinium ring nitrogen atom. By "active hydrogen" is meant active in the Zerewitinoff reaction. Depending upon the molecular weight of the resinous compounds and the number of carbamoylpyridinium groups, the novel compositions range from water-soluble compositions having superb surfactant properties to water-dispersible film-forming compositions which are readily combined with water to form artificial latexes. The number average molecular weight of these compounds ranges from about 400 to about 7000 (preferably from about 900 to about 4000). Aqueous dispersions comprising the novel carbamoylpyridinium compositions are excellent coating compositions which may be applied to common methods including cathodic electrodeposition; e.g., the pigmented latexes containing a suitable amine-aldehyde cross-linker and preferably having a small particle size (less than about 1500 Angstroms) are excellent in this regard. The carbamoylpyridinium compositions are also particularly useful for imparting corrosion resistance to coatings on steel.

The carbamoylpyridiniums here described represent a unique class of pH independent compounds which differ greatly from the conventional tertiary amine resin systems which are dispersed in water with acids and which differ sharply from the conventional quaternary ammonium systems. The protonated amine dispersed systems are highly pH sensitive and the charge density varies directly with the number of amine nitrogen atoms which are protonated or deprotonated. The quaternary ammonium systems are pH independent. (i.e., unaffected by protonation or deprotonation of the hetero atom) over substantially the entire pH range. The quaternary ammonium systems, for example, are stable for extended periods of time at pH of 12 or 13, which is the pH at or near the cathode surface during electrodeposition. The carbamoylpyridinium resins, on the other hand, are pH independent over the useful pH range of from approximately 3 to about 10 but at a pH of greater than about 10, the carbamoylpyridinium ring decomposes into various nonionic products. Thus, the carbamoylpyridinium resins are made and kept at a pH below 10. However, the instability at a pH of greater than about 10 during electrodeposition leads to charge destruction at the cathode surface, with the simultaneous loss of colloidal stability which assists in the rapid deposition of a less conductive coating of resin particles on the cathode surface. This gives the carbamoylpyridinium resin systems, therefore, the advantages both of the quaternary ammonium in terms of pH independence and the advantage of the tertiary amine type electrodeposition systems of charge destruction and instability at elevated pH. Thus, more rapid current cut off and greater throwing power are provided.

The carbamoylpyridinium resins have the further advantage that they don't release nitrogen-containing volatiles during cure although they cure as well or even better with acid curable cross-linkers than with isocyanate cross-linkers. This characteristic is unexpected and in marked contrast to the pyridinium resins in general as described in copending application Ser. No. 292,479 filed on or about Aug. 13, 1981) which is a continuation of application Ser. No. 6936, filed Jan. 25, 1979. The usual pyridinium resins as described in that application cure poorly with the acid catalyzed cross-linkers.

Among the carbamoylpyridinium, especially preferred are those derived from 3-carbamoylpyridine, generally known as niacinamide or nicotinamide. Nicotinamide is a common food additive and thus can be used in applications involving food contact. Furthermore, resins prepared from nicotinamide according to this invention can be used with amine-aldehyde cross-linking resins which are also acceptable in food contact applications. Thus, the 3-carbamoylpyridinium resins cured with amine-aldehyde crosslinkers are especially preferred compositions.

Definitions

By "water-soluble" is meant a resinous compound which forms a thermodynamically stable mixture with water. The mixtures form spontaneously and have been referred to in the prior art as true solutions if the individual molecules are dispersed, and as micellar or colloidal solutions if the molecules exist in an aggregated state.

In contrast, by "water-dispersible" is meant a resinous compound which can be dispersed in water without the use of surfactants to form an artificial latex which is meta-stable in the thermodynamic sense. The resin does not, however, spontaneously form a colloidal solution.

Those skilled in the art recognize that the boundary between water-soluble and water-dispersible is not sharp. The transition from one class to the other depends on resin polarity, molecular weight, charge density, type of counter ion and the level of coupling solvents. In many cases, the resin comprises a mixture of water-soluble and water-dispersible species.

By the term "water-compatible" as applied to the resinous compounds is meant water-dispersible materials, water-soluble materials or mixtures thereof according to the foregoing description.

In this specification, aqueous dispersions comprised of water-insoluble preformed polymers are termed artificial latexes as contrasted with synthetic latexes formed directly by emulsion polymerization. According to some conventions, the non-film forming artificial latexes are categorized as aqueous dispersions (i.e., solid particles dispersed in liquid). Film-forming latexes, by analogy, are categorized as emulsions (i.e., liquid dispersed in liquid). The term "artificial latex", therefore, includes both types as well as mixtures also containing water-soluble polymers.

"Artificial latexes" are latexes produced by the dispersion or redispersion of pre-formed water-insoluble polymers or solutions thereof. Artificial latexes are produced by known emulsification processes, e.g., by addition of water with stirring until phase inversion occurs, by high shear mixing with water at elevated temperatures or by dilution of a mixture of water and a water-miscible solvent followed by stripping to remove the solvent. A surfactant is required in the emulsification process unless hydrophilic groups are attached to the polymer in amounts sufficient to assist dispersion but insufficient to produce water-solubility. Such artificial latexes are produced from polymers which are not prepared readily from monomers by emulsion polymerization.

DETAILED DESCRIPTION OF THE INVENTION

The water-compatible compositions can be prepared by reacting a carbamoylpyridine with a resin containing alkylating group substituents such as active halogen and epoxide. The preferred water-compatible compositions are conveniently prepared by reacting a resinous organic compound having at least one terminal 1,2-epoxy group with a carbamoylpyridine in the presence of sufficient amounts of a Brönsted acid (i.e., a protic acid) and water to stabilize the carbamoylpyridinium salt thus formed.

Another method is to react the resinous epoxide with a hydrohalic acid (e.g., HCl, HBr, HI) to first form the corresponding resinous halohydrin which is then reacted with the carbamoylpyridine reactant in the presence of sufficient water to stabilize the resinous carbamoylpyridinium halide salt thus formed.

In yet another process, the resinous organic compound terminated with a phenolic hydroxyl group is reacted with a dihalo compound (such as a dichloro or dibromo alkane) having at least two carbon atoms with the halo substituents located on different carbon atoms in the molecule. This step of the reaction is conducted in the presence of a hydrohalide acceptor. The reaction product bears a terminal chloro or bromo group and reacts with a carbamoylpyridine in the presence of a protic solvent (e.g., water or a lower alkanol) to give the desired carbamoylpyridinium compound.

Other processes for making the desired compounds will be apparent to those skilled in the art. The presently preferred process for making the compositions is represented by the first process in which a resinous epoxide is reacted with a carbamoylpyridine in the presence of acid and water. All subsequent remarks directed to reactants, process conditions, etc. will be directed to this process.

The preferred resinous epoxy-containing reactant has a linear or substantially linear backbone which consists essentially of at least one oxyarylene-oxyalkylene or oxyaryleneoxy(1,3-(2-hydroxy)alkylene) unit and which bears at least one group having an active hydrogen, such as an aliphatic hydroxyl group, and at least one terminal 1,2-epoxy group. An "aliphatic hydroxyl group" is an organic group having a hydroxyl moiety (—OH) attached to an aliphatic carbon atom; e.g.,

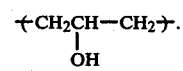

An "arylene" group is, of course, a divalent aromatic mono- or polynuclear hydrocarbon or a polynuclear hydrocarbon whose chain length is interrupted by a divalent connecting group(s) between aromatic rings. Likewise, an "alkylene" group is a divalent alkane group. Many of these resinous materials have been prepared by the condensation of an epihalohydrin (e.g., epichlorohydrin) with a dihydric mono- or polynuclear phenol (e.g., bisphenol A). The ratio of reactants in the reaction of epihalohydrin with the dihydric phenol determines whether the end product has terminal phenolic hydroxyl groups, terminal glycidyl ether groups, or one terminal glycidyl ether group and one terminal phenolic hydroxyl group. Most commercially available epoxy resins of this type have an average of two terminal glycidyl ether groups. A wide variety of these epoxy resins are described, for example, in the classical text, "Handbook of Epoxy Resins" by Lee and Neville, McGraw-Hill Publishing Company, New York (1967) and in "Epoxy Resins, Chemistry and Technology", by May and Tanaka, Marcel Dekker, Inc. (1973). Polymers of the reaction of an epihalohydrin with a dihydric phenol consist of oxyaryleneoxy(1,3-(2-hydroxy)propylene) units. Preferred resinous materials have backbones which consist essentially of repeating units of the formula

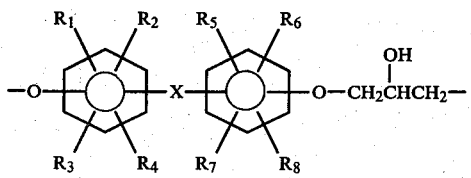

wherein: X is a single covalent chemical bond or a divalent alkali-stable connecting group. X is preferably a single covalent bond; —O—; —S—;

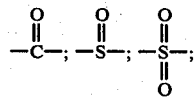

or lower alkylene or lower alkylidene of from 1 to 6 carbon atoms, inclusive (X is preferably methylene or isopropylidene, and is most preferably isopropylidene); and $R_1$–$R_8$ are each independently hydrogen, halo, hydrocarbyl, hydrocarbyloxy, or inertly-substituted hydrocarbyl or hydrocarbyloxy groups ($R_1$–$R_8$ are preferably hydrogen, chloro or bromo, and more preferably are each hydrogen).

The functionality of an epoxy resin having on the average more than one epoxy group per molecule can be reduced by reacting the polyepoxide with a capping group (e.g., a carboxylic acid or anhydride, a phenol, an alcohol, etc.) or even by hydrolyzing some of the epoxy groups. Preferably, the resin is capped with an alkylphenol (having from 4 to about 18 carbons in the alkly group, preferably 8 to 10, carbons located predominantly in the meta or para ring position), or other such reagent which provides a hydrophobic terminal group bonded through an alkali resistant linkage (preferably an ether linkage). This type of capped resinous epoxide (which is, generally, a statistical mixture of resinous epoxides) is extremely valuable as a reactant in forming our water-compatible carbamoylpyridinium compositions which have an alkali resistant backbone structure and capping group. Such products are particularly useful in cathodic electrodeposition and as binders for corrosion resistant primers on steel. During cathodic electrodeposition, the surface of the cathode is a highly alkaline environment which can cause certain polymers to degrade. Also, during active corrosion on steel a highly alkaline environment is created in the vicinity of the corroding front. The alkalinity softens, swells and chemically attacks conventional (normally ester-containing) resin binders leading to a loss of adhesion and eventual paint failure. It is therefore important that resins used for steel coatings without regard to the method of application have a backbone made of an alkali resistant structure (i.e., one that resists degradation or swelling in the corrosion environment). Resin structures bearing ester groups, epoxy groups, glycol ether groups, etc., in addition to at least one carbamoylpyridinium group are included within the scope of this invention and such materials can be satisfactorily utilized as coating compositions and in electrodeposition. The alkylphenol capped resins, however, have superior performance in an alkaline environment and are, therefore, preferred when the carbamoylpyridinium resins are to be used in cathodic electrodeposition and/or as binders for corrosion resistant coatings on steel applied by any method.

Resins with a limited amount of branching can be used particularly where capping is employed to reduce functionality. Such resins can be obtained by using small amounts of novolaks or polyphenols in the preparation of the resin. The amounts are selected such that there is no significant interference with solubility and flow out. Resins of the foregoing description are considered within the term "substantially linear".

Substantially any Brönsted acid can be used in forming the carbamoylpyridinium compounds so long as the acid is sufficiently strong to promote the reaction between the carbamoylpyridine and the vicinal epoxide group(s) on the resinous reactant. Monobasic acids are normally preferred ($H^{\oplus}A^{\ominus}$). Suitable inorganic acids include, for example, phosphoric acid, hydrochloric acid, hydrobromic acid, nitric acid, sulfuric acid, etc. Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, itaconic acid, maleic acid, etc.) hydroxy-functional carboxylic acids (e.g., glycolic acid, lactic acid, citric acid, etc.) and organic sulfonic acids (e.g., methanesulfonic acid), and the like. The acid in this reaction has two important functions. First it promotes the reaction between the carbamoylpyridine and the vicinal epoxy group on the resinous reactant. Second, the acid provides a compatible anion in the final product. Presently preferred acids are lower alkanoic acids of one to four carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1–4 carbon atoms. Acetate and lactate are the most preferred anions.

The ratio of epoxy-containing reactant/carbamoylpyridine reactant/Brönsted acid is variable so long as the reaction mixture is at a neutral or acid pH. Stoichiometry of the reaction requires 1 equivalent of carbamoylpyridine and 1 equivalent of acid per vicinal epoxy group converted.

In order to form the instant carbamoylpyridinium compounds from strong acids, an excess of the carbamoylpyridine is required. For example, excellent results can be achieved using from about 2 to about 5 equivalents of carbamoylpyridine per acid equivalent. With weaker acids, e.g., phosphoric acid, good results can be achieved by using substantially stoichiometric amounts of reactants although a slight excess or deficiency of the epoxy-containing reactant or carbamoylpyridine can be used. With still weaker acids (e.g., carboxylic acids, such as acetic acid) a slight excess of acid is preferred to maximize the yield of carbamoylpyridinium salts. Good results have been achieved using a ratio of about 1.1 equivalents of weak acid and one equivalent of carbamoylpyridine per epoxy equivalent. The amount of water that is also included in the reaction mixture can be varied to convenience so long as there is sufficient acid and water present to stabilize the carbamoylpyridinium salt formed during the course of the reaction. Normally, it has been found preferable to include water in the reaction in amounts of from about 10 to about 30 moles per epoxy equivalent.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$-$C_4$ alkylene glycols. This class of compounds includes, for example, the monomethyl ether of ethylene glycol, the monobutyl ether of ethylene glycol, etc. A variety of these aklyl ethers of alkylene glycols are commercially available.

The reaction is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates have been observed at temperatures of from about 25° C. to about 100° C. with preferred reaction rates being observed at temperatures from about 60° C. to about 80° C.

The products produced by this reaction of a carbamoylpyridine with a resinous epoxy-containing reactant having for purposes of illustration an average of one vicinal epoxy group per molecule in the presence of acid and water are, of course, included within the novel class of water-compatible carbamoylpyridinium compositions. This reaction product will typically comprise a statistical distribution of compounds in which most of the resinous epoxy-containing molecules will contain one terminal carbamoylpyridinium group, a number of the resinous epoxy-containing molecules will have been unconverted and will be nonionic species, and a number of resinous molecules will bear two terminal carbamoylpyridinium groups. This statistical distribution flows in part from the fact that the epoxy-containing resinous compounds are themselves resinous mixtures with the epoxy number being merely an average and in part from incomplete and/or competing reactions (i.e., hydrolysis or esterification). The significant point is, however, that the presence of such nonionic species is not detrimental in forming and/or using the artificial latexes and their presence can be advantageous. Very useful resinous mixtures derived from modified epoxy resins are those in which the average number of carbamoylpyridinium groups is less than one per molecule of resinous compound. If desired, the components in the product mixture can be isolated by conventional fractionation methods, e.g., by fractional precipitation or by gradient elution chromatography.

Solvents have a variety of uses in the preparation of the novel carbamoylpryridinium-modified resins, in the preparation of artificial latexes from the carbamoylpyridinium-modified resins, and in the formulation of coatings. In making the carbamoylpyridinium-modified resins, the primary purpose of the solvent is to control the viscosity of the reaction mixture and the compatibility of the components. Normally, one selects a solvent which will perform this function and also be compatible with the final coating formulation. In practice, these solvents are commercially available and are quite good in plasticizing resin, reducing the viscosity of the resin, and also facilitating the formation of latexes by acting as coupling solvents. The amount of solvent used will depend upon the molecular weight or, perhaps more strictly, on the viscosity of the epoxy-containing resinous reactant and upon the charge density (milliequivalents per gram of resin solids) on the final carbamoylpyridinium-modified resinous product. The more difficult the carbamoylpyridinium-modified resin is to emulsify, the higher the level of solvent that is desirable in the formulation. Normally, solvent levels can be varied from zero up to about 50 weight percent, based on resin solids.

In making artificial latexes, conventional plasticizing solvents are not normally required or employed; but, they do not have to be excluded either. Solvents (e.g., 2-ethylhexanol) which remain predominantly in the oil phase and soften the polymer particles can be used but their primary function and utility is in the subsequent coating processes rather than in the emulsification. Normally the artificial latexes are made by dispersing the resins in water at elevated tempertures and the polymer particles are thus softened by heat.

Cross-linking of the novel water-compatible compositions can be achieved through residual epoxy groups, but preferably the preparation reaction is conducted such a way as to render the water-compatible composition substantially free of epoxy-group and to achieve cross-linking through free aliphatic hydroxy groups or other active hydrogen sites in the molecule.

The preferred method of cross-linking is to combine the carbamoylpyridinium resin with a cross-linker containing activated hydroxymethyl (methylol) groups or their alkylated adducts. Those materials are also referred to as phenoplast and aminoplast resins. For optimum performance, these cross-linkers require acid catalysis. Consequently, their use in the known cationic resins which contain basic nitrogen groups gives poor results unless excess acid catalyst is employed. In the resins of the present invention, adequate cure is obtained with normal levels of catalyst. This class of cross-linking resins is well-known. (See, for example, *Encyclopedia of Polymer Science and Technology*, Interscience, N.Y., N. M. Bikales, editor, Vol. 2, pages 1–94; Vol. 7, pages 432–445 and Vol. 10, pages 1–73). The preferred cross-linkers are the amine-aldehyde condensates, especially fully alkylated melamine-formaldehyde condensates.

The amount of cross-linking agent required depends on the structure of the cross-linking compound, the curing condition and the degree of cross-linking desired in the cured coating. Normally, amounts of from 5 to about 30 parts, preferably 10 to 20 parts of cross-linking agent per 100 parts based on total weight of the resin and cross-linking agent. Catalyst levels employed range from 0.1 to about 2 percent, preferably one should use the minimum amount needed to achieve the desired cure rate.

When the water-compatible compositions are to be used as coating compositions, they can be formulated with conventional additives, if desired. For example, antifoam agents, pigments, flow control agents, coupling solvents, coalescing solvents, plasticizers, etc., can be included so long as such materials are inert to the carbamoylpyridinium-containing resinous materials. These conventional additives are well-known classes of compounds as illustrated for example, by the disclosure in USP 3,962,165 (incorporated by reference).

We have observed that the novel water-compatible compositions having a charge/mass ratio of from about 0.6 to about 3 milliequivalents of carbamoylpyridinium nitrogen per gram of resin solids (meq/g) are unusually effective as dispersants for pigments. Pigments used in electrocoating compositions form a known class of compounds comprising inorganic and/or organic pigments. This known class is illustrated by the pigments named in U.S. Pat. Nos. 3,936,405 and 4,035,275 (incorporated by reference). The inorganic pigments (e.g., titanium dioxide, magnesium silicate, black iron oxide, aluminum silicate, china clay, lead silicate, carbon black, etc.) are the best known and most widely used in coating compositions, and are therefore preferred to use herein. In making such dispersions, a sufficient amount of the water-compatible (preferably water-soluble) compositions is used to make a dispersion which is stable in a cationic environment. We have also observed that when such pigment dispersions are to be used in compositions for coating steel that the performance of the coating is enhanced by the inclusion of corrosion inhibiting pigments. Corrosion inhibiting pigments (i.e., pigments which increase the corrosion inhibitive effect of coatings containing such pigments) are represented, for example, by zinc yellow, basic zinc chromate, strontium chromate, calcium chromate, barium chromate, red lead and basic lead silico chromate. For illustration, electrodeposited coatings containing the novel compositions and a lead silicate tended to be more corrosion resistant (as measured by a salt fog test-ASTM Method B-117).

The water-compatible compositions can be used as coating compositions applied by conventional techniques (e.g., dipping, spraying, brushing, roll coating, etc.) and provide particular advantages in application by cathodic electrodeposition. In coating applications, the novel water-compatible compositions are normally thinned with water to form aqueous solutions or more generally dispersed in water to form latexes which can include the cross-linker, inorganic pigments, etc. When used in electrodeposition, the formulation will normally have a charge/mass ratio of from about 0.2 to about 0.5 milliequivalents of pyridinium nitrogen per gram of solids, total resin solids basis. These compositions are then used as the electrocoating bath.

Aqueous electrocoating formulations comprising novel carbamoylpyridinium-containing water-compatible compositions are characterized by uniform deposition, fast current cut off, low drag out, high throwing power, and high rupture voltages (above about 350 volts). Further, the carbamoylpyridinium-containing water-compatible compositions do not generate tertiary amines or major amounts of carbamoylpyridine during electrodeposition or cure.

Experimental

The following examples will further illustrate the invention. All "parts" are parts by weight and all molecular weights are number average molecular weights unless otherwise specified.

EXAMPLE 1

A commercial liquid epoxy resin having an epoxy equivalent weight of 186 (essentially the diglycidyl ether of bisphenol A; (1774.7 parts), a commercial grade of bisphenol A (725.3 parts), and nonylphenol (283.4 parts) were added to a reaction vessel and thoroughly mixed at a temperature of approximately 45° C. A small but catalytic amount of ethyltriphenylphosphonium acetate/acetic acid complex dissolved in methanol was added and thoroughly mixed with the reaction mixture; this catalyst was added in an amount of approximately 0.1 weight percent, based on the weight of liquid epoxy resin. The reaction vessel and contents were then heated until a temperature exotherm was observed and external heating removed. The temperature of the reaction mixture peaked at 170° C. The reaction mixture was then heated at 150° C. for approximately one hour after the exotherm had subsided. The product was essentially a linear condensation polymer of the diglycidyl ether of bisphenol A and bisphenol A, partially capped with nonylphenoxy groups and having terminal vicinal epoxy groups with an epoxide content of 2.58 weight percent (as analyzed by the perchloric acid technique set forth in Lee and Neville, supra, pp. 4–14, 15). A portion of this reaction mixture (7.95 parts) was removed for analytical purposes and the like. Monobutyl ether of ethylene glycol (491.2 parts) was added to the remainder of the reaction mixture as the mass cooled to approximately 70° C.

Terminal epoxy groups were converted to terminal carbamoylpyridinium groups in the following manner: a solution of nicotinamide (152.7 parts), lactic acid (162.1 parts of an 88 percent aqueous solution) and water (750.1 parts) was slowly added to 2778 parts of the stirred reaction product from the above step; the temperature was maintained at approximately 70° C. and the addition required approximately 35 minutes. The stirred reaction mass was maintained at about 70° C. for approximately 6 hours. The resulting liquid product was a water-dispersible composition of the type identified above and claimed hereafter having a 0.38 milliequivalents of carbamoylpyridinium groups per gram of non-volatiles.

A formulated artifical latex was prepapred by blending 480 parts (solids basis) of the above reaction product with 120 parts (solids basis) of commercial amine/aldehyde resin (Cymel 1116 from American Cyanamid Co.) and 14.4 parts of catalyst mixture 1C with mixing at 50° C.–60° C. [Catalyst mixture 1C is a 5:1 mixture of a sulfonic acid type catalyst (Catalyst 500 from American Cyanamid Co.) and diethylethanol amine]. The mixture was dispersed in water by the method of phase-inversion emulsification, i.e., after the mixture was thoroughly blended, water was slowly added to the reaction mixture at a rate that good mixing was facilitated. The viscosity of the mixture broke (i.e., decreased abruptly) at about 45 weight percent of nonvolatiles. The solids content of the emulsion was further reduced to about 38 weight percent with additional water. A smooth uniform latex (Formulation 1A) was thus formed and subsequently cooled to room temperature.

Formulation 1A was further reduced to 15 weight percent solids with water. The conductivity was 1000 micromhos per centimeter and the pH was 4.8 and the pH was adjusted to 7.6 by adding a sufficient quantity of 10 weight percent aqueous N,N-diethylethanolamine. The conductivity was adjusted to 1820 micromhos per centimeter with 10 weight percent aqueous ammonium acetate (Formulation 1B).

A throwing power bath was prepared consisting of 3 liters of Formulation 1B and using steel test panels as a cathode placed 2 inches from a carbon anode.

The throwing power was measured with the results shown in Table I. The throwing power test as described by D. R. Hays and C. S. White, Journal of Paint Technology 41, No. 535, pages 461–471 (1969) is expressed as the distance in inches coated inside a box made of two 4-inch × 18-inch zinc phosphated steel panels. The panels are taped face to face and separated on the sides by a 3/8-inch insulated spacer. This long narrow box is thus open on the bottom. The box is immersed in a coating emulsion as deep as possible (ca. 16 inches) and coated at the desired voltage for two minutes. After rinsing and baking at 350° F. (177° C.) for 30 minutes, the throw is measured in inches of continuous film coverage on the inside of the box.

TABLE I

| Panel No. | Voltage | Bath Temperature | | Throw | |
|---|---|---|---|---|---|
| | | °F. | °C.* | inches | cm** |
| 1-1 | 250 | 83 | 28.3 | 10.875 | 27.6 |
| 1-2 | 275 | 84 | 28.9 | 11.25 | 28.6 |
| 1-3 | 300 | 86 | 30.0 | 11.875 | 30.2 |
| 1-4 | 335 | 86 | 30.0 | 12. | 30.5 |

*calculated from measured values in °F.
**calculated by conversion of measured values in inches.

Solvent resistance was measured by rubbing, back and forth over the same area of the coated surface of the panels, a cotton cloth soaked in methyl ethyl ketone (MEK) and wrapped around the ball end of a ball peen hammer having a ball diameter of 1.25 inches. A back and forth stroke is referred to as a "double rub." The cured film of about 0.7 mil thickness survived 150 double rubs before the metal surface was exposed.

EXAMPLE 2

A resin was prepared in substantially the same manner as in Example 1 except that the product was not diluted with solvent following completion of the reaction. The product (Resin 2) contained 2.50 percent of epoxy group.

Terminal epoxy groups were converted to terminal carbamoylpyridinium groups in the following manner.

A portion of Resin 2 (690 parts) was heated with monobutyl ether of ethylene glycol (122 parts) to form a solution. A mixture of nicotinamide (36.8 parts), lactic acid (41.6 parts of an 80 percent aqueous solution) and water (72 parts) were mixed together and the mixture was added slowly to the stirred resin solution at 70° C. One half of the resulting mixture was added initially and the rest over a period of 20 minutes. After the mixture was heated for an additional 15 minutes, more water (144 parts) was added. The resulting reaction mixture was then heated for 4 hours and was cooled to room temperature. The product (Resin 2A) contained 69.5 percent of non-volatiles and 0.339 milliequivalent of carbamoylpyridinium ions per gram of non-volatiles.

A portion of Resin 2A (50.4 parts) was blended with a highly ethylated/methylated melamine/aldehyde resin (Cymel 1116) (50.4 parts) and catalyst 1C (See Example 1) (1.2 parts). Tetrahydrofuran (37.4 parts) was added to yield a solution containing 48.1 percent non-volatiles. A portion of the solution was drawn down on a 4 in. × 12 in. cold roller steel test panel using a No. 36 Meyer Rod. The coated panel was heated for 30 minutes at 175° C. to provide a cured film having a thickness of 0.67 mil. The cured film was tested for solvent resistance by the method shown in Example 1. The film survived 80 double rubs before failure.

EXAMPLE 3

Another water-dispersible composition having excellent coating properties was prepared in a similar manner from a higher molecular weight epoxy resin. Here, a commercial epichlorohydrin/bisphenol A condensation product (400 parts) having a molecular weight of approximately 3000 and 2.23 weight percent epoxide content was dissolved in monobutyl ether of ethylene glycol (100 parts) at 160° C. This reaction mixture was cooled to approximately 80° C. and nicotinamide (19.0 parts), lactic acid (21 parts of an 80 percent solids solution), and water (37.3 parts) was added incrementally over a 30-minute period with stirring. An additional 74.6 parts of water was introduced and the reaction mixture was subsequently maintained at 80° C. for 3 hours with continual stirring. After being cooled to room temperature, the product was found to have 55.1 percent solids, and contained 0.346 milliequivalents of carbamoylpyridinium group per gram of nonvolatiles. A portion (154.3 g) of the product was blended with 15 parts of the amine/aldehyde resin used in Example 1, and 1.2 parts of the catalyst 1C (See Example 1). Deionized water was then added slowly with stirring until the resinous mixture inverted to form a latex having 27.8 percent solids, a particle size of 1580 Angstroms and a charge/mass ratio of 0.282 milliequivalents of carbamoylpyridinum per gram of nonvolatiles. A portion of the latex was diluted to 15 percent solids and the pH was adjusted to approximately 7.2 and a conductivity of approximately 2,000 micromhos per centimeter was measured. This was then used as the electrocoating bath in which three panels of untreated, unpolished cold rolled steel were used individually as the cathode by the method set forth in Example 1. After this, the panels were removed from the bath, rinsed with deionized water and baked for 30 minutes at 350° F. (177° C.). The panels thus prepared had a thin, uniform coating of approximately 0.6 to 0.7 mil thickness having excellent hardness and solvent resistance. The salt spray resistance of the film was measured following the procedure of ASTM Method B-117. After 192 hours in the salt spray test, the creep measured across the scribe was ¼ inch on each of three panels. After 336 hours, the creep measured from 7/32 to ½ inch. The solvent resistance was measured by the test set forth in Experiment 1; the coating survived more than 200 MEK double rubs.

EXAMPLE 4

A water-soluble composition having unusually good properties as a pigment-dispersing agent for inorganic pigments was prepared as follows: an epichlorohydrin/bisphenol A condensation product having a molecular weight of approximately 1050 and an epoxy content of 8.19 percent (210 parts), and monobutyl ether of ethylene glycol (37 parts) were blended in a reaction vessel with stirring and heating under a nitrogen atmosphere.

The reaction kettle and contents were heated to 50° C. and 100 parts of Mixture 4-1 was slowly added over a 30-minute period to the reaction mixture. The reaction temperature was raised to 70° C. and the remainder of Mixture 4-1 (210.9 parts was slowly added over the next 30 minutes. Mixture 4-1 contained carbamoylpyridine (48.8 parts), lactic acid (46.1 parts of an 80 percent aqueous solution), and water (216 parts). The mixture was then allowed to cool to 50° C., and stirring was continued for about 16 hours. Water (100 parts) was added and the resulting mixture was heated (75° C.) for 2 hours. The resulting product (Solution 4A) was a clear, viscous, soapy liquid which can be easily diluted with water to form an essentially clear liquid (indicating the water-solubility of the resinous product). This product had 2.22 milliequivalents of a carbamoylpyridinium group per gram of nonvolatiles and a nonvolatile content of 47.3 weight percent.

A pigment grind 4B was prepared by blending an aliquot of Solution 4A (94 parts) with water (175 parts), acetic acid (3 parts), talc (140 parts), lead silicate (40 parts), carbon black (20 parts), in a ball mill. The materials were ball milled together for approximately 24 hours and the pigment grind recovered. This pigment grind was likewise a smooth uniform dispersion having a 51.4 weight percent solids.

EXAMPLE 5

A composition for use in cathodic electrodeposition was prepared by blending 177 parts of pigment grind 4B with approximately 3,000 parts of Formulation 1B to give an emulsion having approximately 15 weight percent pigment, based on the total weight of solids. This material was electrocoated onto cold rolled steel panels as per Experiment 1. The panels were removed, rinsed with deionized water, and baked at 350° F. for 30 minutes. The panels were thus coated with a hard uniform coating having excellent solvent resistance and excellent salt spray resistance. The coating survived more than 100 MEK double rubs and had a total creep of less than ⅛ inch in three weeks.

Analytical

The molecular weights and molecular weight distribution of epoxy resins are determined by conventional techniques. The most frequently used technique, however, is gel permeation chromatography utilizing a polystyrene standard or other standard, as illustrated by the series of papers by H. Batzer and S. A. Zahir (the first of which was published in the Journal of Applied Polymer Science, Vol. 19, 585–600 (1975)). The carbamoylpyridinium concentration can also be determined by conventional analytical techniques. Alternatively, the carbamoylpyridinium concentration can be determined by titrating for the counterion or by isolating unreacted carbamoylpyridine by liquid chromatography techniques using a precolumn to separate cationic resinous components from the unreacted carbamoylpyridine. Particle size of the unpigmented emulsions, for example, can be determined by conventional light scattering techniques. Other analytical techniques for analyzing cationic polymers are set forth in the patents incorporated by reference above.

What is claimed is:

1. A water-compatible composition comprising (A) one or more resinous polymers having a backbone which is linear or substantially linear and consists essentially of at least one oxyaryleneoxyalkylene or oxyarylenoxy-(1,3-(2-hydroxy)-alkylene)) unit and which bears at least two active hydrogen groups, said resinous composition having carbamoylpyridinium groups attached through a ring nitrogen and (B) a cross-linking agent selected from the group consisting of amine aldehyde resins and phenol aldehyde resins.

2. The composition of claim 1 wherein the resin is derived from epoxy resin.

3. The composition of claim 1 wherein the cross-linking agent is an alkylated melamine aldehyde resin.

4. The composition defined by claim 1, in which the carbamoylpyridinium groups are 3-carbamoylpyridinium groups.

5. The composition of claim 4 wherein the cross-linking agent is an alkylated melamine-formaldehyde resin.

* * * * *